United States Patent [19] [11] 4,431,431
Sarin et al. [45] Feb. 14, 1984

[54] CARBIDE COATED SILICON NITRIDE CUTTING TOOLS

[75] Inventors: Vinod K. Sarin, Lexington; Sergej-Tomislav Buljan, Acton, both of Mass.

[73] Assignee: GTE Laboratories Incorporated, Waltham, Mass.

[21] Appl. No.: 380,384

[22] Filed: May 20, 1982

[51] Int. Cl.$^3$ .................................................. B24D 11/00
[52] U.S. Cl. ........................................ 51/295; 51/307; 51/308; 51/309; 427/215; 428/404
[58] Field of Search .............. 51/295, 307, 308, 309; 427/215; 428/404, 698

[56] References Cited

U.S. PATENT DOCUMENTS

| | | | |
|---|---|---|---|
| 3,684,585 | 8/1972 | Stroup et al. | 427/249 |
| 3,868,235 | 2/1975 | Held | 51/309 |
| 4,101,703 | 7/1978 | Schintlmeister | 428/698 |
| 4,169,913 | 10/1979 | Kobayashi et al. | 428/217 |
| 4,179,301 | 12/1979 | Buljan | 501/154 |
| 4,269,899 | 5/1981 | Fuyama et al. | 428/698 |
| 4,357,382 | 11/1982 | Lambert et al. | 428/698 |

*Primary Examiner*—Donald E. Czaja
*Assistant Examiner*—W. Thompson
*Attorney, Agent, or Firm*—Jerry F. Janssen; Ivan L. Ericson

[57] ABSTRACT

Cutting tools and cutting tool inserts having improved mechanical and chemical wear resistance under demanding conditions of machining speed, temperature, or workpiece hardness comprise a silicon nitride substrate body having at least one hard, adherent coating layer of a refractory metal carbide. The silicon nitride substrate body consists essentially of a first phase of silicon nitride and a refractory second phase comprising silicon nitride and an effective amount of a densification aid selected from the group consisting of silicon dioxide, aluminum oxide, magnesium oxide, yttrium oxide, hafnium oxide, zirconium oxide, the lanthanide rare earth oxides, and mixtures thereof.

13 Claims, No Drawings

CARBIDE COATED SILICON NITRIDE CUTTING TOOLS

CROSS-REFERENCE TO RELATED APPLICATIONS

This application contains subject matter related to matter disclosed and claimed in copending patent application, Ser. No. 128,070 filed Mar. 7, 1980 entitled "Abrasion Resistant Silicon Nitride Based Articles" and in the following copending applications filed concurrently herewith, all assigned to the assignee of the present application:

Application Ser. No. 380,364 entitled "Composite Ceramic Cutting Tool";

Application Ser. No. 380,361 entitled "Process for Making a Modified Silicon Aluminum Oxynitride Based Composite Cutting Tool";

Application Ser. No. 380,363, entitled "Alumina Coated Silicon Nitride Cutting Tools";

Application Ser. No. 380,381, entitled "Carbonitride Coated Silicon Nitride Cutting Tools";

Application Ser. No. 380,383, entitled "Nitride Coated Silicon Nitride Cutting Tools";

Application Ser. No. 380,362, entitled "Carbide Coated Composite Silicon Nitride Cutting Tools";

Application Ser. No. 380,379, entitled "Alumina Coated Composite Silicon Nitride Cutting Tools";

Application Ser. No. 380,382, entitled "Carbonitride Coated Composite Silicon Nitride Cutting Tools";

Application Ser. No. 380,380, entitled "Nitride Coated Composite Silicon Nitride Cutting Tools";

Application Ser. No. 380,387, entitled "Carbide Coated Composite Modified Silicon Aluminum Oxynitride Cutting Tools";

Application Ser. No. 380,388, entitled "Alumina Coated Composite Modified Silicon Aluminum Oxynitride Cutting Tools";

Application Ser. No. 380,389, entitled "Carbonitride Coated Composite Modified Silicon Aluminum Oxynitride Cutting Tools";

Application Ser. No. 380,452, entitled "Nitride Coated Composite Modified Silicon Aluminum Oxynitride Cutting Tools".

FIELD OF THE INVENTION

This invention relates to ceramic cutting tools and cutting tool inserts. More particularly, it is concerned with densified silicon nitride cutting tools and cutting tool inserts having a refractory metal carbide coating.

BACKGROUND OF THE INVENTION

Cemented carbide materials are well known for their unique combination of properties of hardness, strength, and wear resistance and have accordingly found extensive use in mining tool bits, metal cutting and boring tools, metal drawing dies, wear resistant machine parts and the like. It is known that the wear resistance of cemented carbide materials may be enhanced by the application of thin coatings of a highly wear resistant material such as titanium carbide or aluminum oxide. These coated carbide materials are finding increasing commercial utility for certain cutting tool and machining applications.

Economic pressures for higher productivity in machining applications are placing increasing demands upon the performance of cutting tool materials. To achieve high productivity in machining, a tool must be able to cut at high speeds. At cutting speeds exceeding 1500 surface feet per minute (sfpm), the high temperature strength and chemical inertness of a cutting tool material become more and more important. The usefulness of cemented carbide cutting tool materials (the predominant material used in cutting tools today) has been extended to applications requiring cutting speeds of about 1500 sfpm by coating such tools with aluminum oxide. For cutting speeds in excess of 1500 sfpm, cemented carbide tools encounter problems associated with loss of strength and tool nose deformation, which affect dimensional tolerance in the workpiece and contribute to shorter tool life.

Conventional ceramic cutting tools overcome many of these disadvantages but have some limitations relating to their lower impact strength and fracture toughness. This is especially true of many alumina-based conventional ceramic cutting tools. Silicon nitride-based ceramic cutting tools have significantly higher impact strength and fracture toughness, but can exhibit lower than desired chemical inertness when employed in cutting long-chipping metals such as steel.

OBJECTS OF THE INVENTION

It is therefore an object of the present invention to provide improved cutting tools and cutting tool inserts.

It is another object of this invention to provide improved cutting tool inserts useful in the machining of metals under demanding conditions of machining speed, temperature, or workpiece hardness.

It is another object of the present invention to provide an improved abrasion resistant composite ceramic cutting tool with improved performance in cutting long-chipping workpiece materials.

SUMMARY OF THE INVENTION

These and other objects and advantages are achieved in accordance with the present invention wherein there is provided a coated ceramic cutting tool or cutting tool insert comprising a densified silicon nitride substrate body having at least one hard, adherent coating layer consisting essentially of a refractory metal carbide. The substrate body consists essentially of a first phase of silicon nitride and a second refractory phase comprising silicon nitride and an effective amount of a densification additive selected from the group consisting of silicon dioxide, aluminum oxide, magnesium oxide, yttrium oxide, zirconium oxide, hafnium oxide, the lanthanide rare earth oxides, and mixtures thereof.

DETAILED DESCRIPTION

The substrate body of coated silicon nitride cutting tools and tool inserts in accordance with this invention possesses a microstructure consisting essentially of a first phase of silicon nitride and a refractory second phase comprising silicon nitride and an effective amount of a densification aid selected from the group consisting of aluminum oxide, silicon dioxide, yttrium oxide, hafnium oxide, zirconium oxide, the lanthanide rare earth oxides, and mixtures thereof.

Because the refractory intergranular phase is essentially continuous, and because impurities and additives present in the overall composite substrate body tend to concentrate in the intergranular phase during the densifying process, the composition of the interganular phase profoundly affects the high temperature properties of the densified composite.

It is considered important to incorporate into this intergranular phase of the substrate body a densification aid which permits densification to densities approaching theoretical, and at the same time does not deleteriously affect the high temperature strength and creep resistance of the overall composite. Typical densification aids useful for this purpose are metal oxides selected from silicon dioxide aluminum oxide, silicon dioxide, magnesium oxide, yttrium oxide, zirconium oxide, hafnium oxide, the lanthanide rare earth oxides, and mixtures thereof. Yttrium oxide and hafnium oxide are preferred.

The metal oxide densification aid is employed in amounts from a lower effective amount which permits full densification to an upper amount which does not unduly affect the high temperature properties of the body. Preferably the metal oxide densification aid comprises from about 1 weight percent to about 25 weight percent of the substrate body. More preferably, the metal oxide comprises from about 1 weight percent to about 5 weight percent of the body.

Silicon dioxide may be added to the initial powder mixture employed in the formation of the substrate body or alternatively, may be present as a surface oxide coating on the silicon nitride employed. During subsequent processing of the powder mixture to form the densified composite silicon nitride substrate body, the silicon dioxide and other metal oxide densification aid tend to concentrate in the refractory intergranular phase. It is preferred that the amount of silicon dioxide present in the final densified body comprise less than about 5 weight percent of the substrate body.

The intergranular phase of the substrate may contain further additional materials in the form of additives or impurities in addition to the above-mentioned silicon dioxide and metal oxide densification aids. Such further additional materials are preferably present in amounts less than about 5 weight percent of the host matrix.

The starting silicon nitride powder employed in the preparation of the ceramic substrate bodies of tools in accordance with this invention may be partly crystallized amorphous material, a mixture of substantially amorphous and substantially crystalline material, or substantially completely crystalline material. The starting material may be processed to a powder compact of adequate green strength by thoroughly mixing with any binders or pressing aids which may be employed, for example by ball milling in a non-reactive medium such as toluene or methanol, and subsequently consolidating the mixture by pressing, extruding, or slip casting. Processing may also optionally include a pre-sintering or prereacting step in which either the uncompacted powder or the powder compact is heated at moderate temperatures such as from about 500° C. to about 1000° C. in order to remove any binders and volatile solvents and to partially react the starting materials.

The substrate bodies of cutting tools of this invention are made by compacting the above-mentioned components to a highly dense article by conventional techniques such as sintering, hot pressing, or hot isostatic pressing. Since the strength of the resulting cutting tools decreases with increasing porosity of the compact, it is important that the compact be densified to a density as closely approaching theoretical density as possible.

It has been found that mechanical mixing of the powdered components of the cutting tools of this invention results in smaller or larger inhomogeneities in the distribution of the modifying phase. These inhomogeneities may be of the order of 5 to 300 microns in size, resulting in undesired localized variation in properties of the matrix.

Homogeneity of the cutting tool material is an extremely important factor for tool performance. During cutting, only a small portion of the cutting tool is exposed to high stress and elevated temperatures. The temperature induced changes in mechanical properties, which are also compositionally dependent, contribute to fracture and chipping at the tool edge, in turn contributing to the rate of tool wear.

The powder blends employed as starting mixtures for tool substrates of this invention are densified to a density of at least 98% of theoretical by pressing followed by sintering, hot-pressing, gas over-pressure sintering, or hot isostatic pressing in a non-oxidizing atmosphere. Temperatures employed for pressing followed by sintering range from about 1600° C. to about 1800° C., preferably from about 1700° C. to about 1800° C. Hot-pressing is carried out at pressures greater than about 2000 psig (13,790 kN/M$^2$) at temperatures ranging from about 1600° C. to about 1900° C., preferably from about 1700° C. to about 1900° C. Gas over-pressure sintering is carried out at pressures from about 150 to about 200 psig (about 1030 to about 1380 kN/M$^2$) and at temperatures ranging from about 1600° C. to about 1950° C., preferably from about 1700° C. to about 1950° C. Hot isostatic pressing is carried out at pressures ranging above 10,000 psig (68,947 kN/M$^2$) and at temperatures ranging from 1600° C. to about 1900° C., preferably from about 1700° C. to about 1800° C. Sintering is carried out without pressure at temperatures ranging between about 1400° C. and about 1700° C. for at least one hour, and preferably at temperatures between about 1600° C. and 1700° C. for about 1.5 to about 5 hours. Sintering is preferably carried out in a non-reactive atmosphere to prevent formation of undesirable oxide or oxynitride phases.

The following examples are provided to enable one skilled in the art to practice the present invention. They are merely illustrative of the present invention and should not be viewed as limiting the scope of the invention as defined by the appended claims.

TYPICAL PREPARATION OF THE SUBSTRATE BODY

A 68 gram batch of silicon nitride powder containing 5 weight percent magnesium oxide sintering additive was mixed with 159.8 grams of toluene, 5.44 grams of methanol and 2.04 grams of magnesium stearate. The batch was thoroughly mixed by milling in a two quart polyethylene jar with about 2000 grams of milling medium for ½ hour. The resulting slurry was dried at about 105° C. and the dry batch was dry ball milled in a polyethylene jar for 24 hours. To this dry ball milled batch were added 2.04 grams of Carbowax, 68 grams of toluene, and 2.04 grams of methanol. The resulting mixture was milled for fifteen minutes and the resulting slurry was dried at about 105° C. The dried powder mixture was screened through a 60 mesh screen and the −60 mesh fraction was pressed at about 25,000 psig to obtain a green powder compact.

The magnesium stearate and Carbowax binders were removed by heating the green compact at a rate of about 50° C. per hour to a temperature of about 600° C. and maintaining the final temperature for about 4 hours in air. The compact was sintered at 1700° C. for about 5 hours to produce a densified silicon nitride body having substantially full density.

In accordance with the principles of the present invention, the substrate body is coated with at least one hard, adherent coating layer comprising a refractory metal carbide. Typical metal carbides include the carbides of titanium, vanadium, chromium, zirconium, niobium, molybdenum, hafnium, tantalum, and tungsten. Preferred coatings in accordance with this invention are titanium carbide and hafnium carbide.

The coating layer is of a thickness ranging between about 0.1 microns to about 20 microns, preferably between about 1.0 and about 10 microns.

COATING METHODS

The substrate bodies produced by the methods described above are coated with a refractory metal carbide by chemical vapor deposition techniques or physical vapor deposition techniques. For example, the preferred coatings of titanium carbide or hafnium carbide are applied by chemical vapor deposition. Other metal carbides are applied by chemical vapor deposition techniques where such techniques are applicable, or by physical vapor deposition techniques such as direct evaporation, sputtering, etc.

Useful characteristics of the chemical vapor deposition method are the purity of the deposited layer and the tendency for some diffusional interaction between the layer being deposited and the substrate during early stages of the deposition process which leads to good layer adherency.

As an example, titanium carbide layers are formed on the silicon nitride substrate bodies of cutting tools of this invention by passing a gaseous mixture of titanium tetrachloride, a gaseous carbon source such as methane, and hydrogen over the substrate at a temperature of between about 800° C. and 1500° C., preferably at temperatures above about 1000° C. The reaction is described by the following equation, although hydrogen is often added to insure that the reaction takes place in a reducing environment:

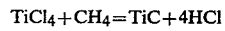

$$TiCl_4 + CH_4 = TiC + 4HCl$$

The mixture is passed over the heated substrate until the desired coating thickness is achieved. Routine experimentation is used to determine the rate of coating thickness growth at a particular gaseous flow rate and temperature.

While there have been described what are at present believed to be the preferred embodiments of the present invention, it will be obvious to one of ordinary skill in the art that various changes and modifications may be made thereto without departing from the scope of the invention as defined by the appended claims.

What is claimed is:

1. A coated ceramic cutting tool comprising a densified silicon nitride substrate body having at least one adherent coating layer; said substrate body consisting essentially of a first phase of silicon nitride and a refractory second phase comprising silicon nitride and an effective amount of a densification aid selected from the group consisting of silicon dioxide, aluminum oxide, magnesium oxide, yttrium oxide, hafnium oxide, zirconium oxide, the lanthanide rare earth oxides, and mixtures thereof; said adherent coating layer consisting essentially of a refractory metal carbide.

2. A coated ceramic cutting tool in accordance with claim 1 wherein said adherent coating layer is selected from the group consisting of titanium carbide, vanadium carbide, chromium carbide, zirconium carbide, niobium carbide, molybdenum carbide, hafnium carbide, tantalum carbide, and tungsten carbide.

3. A coated ceramic cutting tool in accordance with claim 2 wherein said adherent coating layer is titanium carbide or hafnium carbide.

4. A coated ceramic cutting tool in accordance with claim 1 wherein said adherent coating layer is of a thickness between about 0.1 microns and 10 microns.

5. A coated ceramic cutting tool in accordance with claim 4 wherein said adherent coating layer is of a thickness between about 1.0 and about 10 microns.

6. A coated ceramic cutting tool in accordance with claim 1 wherein said densification aid is present in an amount of between about 1 and about 25 weight percent of said substrate body.

7. A coated ceramic cutting tool in accordance with claim 6 wherein said densification aid is present in an amount of between about 1 and about 5 weight percent of said substrate body.

8. A coated ceramic cutting tool in accordance with claim 7 wherein said densification aid is silicon dioxide.

9. A coated ceramic cutting tool in accordance with claim 1 wherein said densification aid is magnesium oxide.

10. A coated ceramic cutting tool in accordance with claim 1 wherein said densification aid is aluminum oxide.

11. A coated ceramic cutting tool in accordance with claim 1 wherein said densification aid is yttrium oxide.

12. A coated ceramic cutting tool in accordance with claim 1 wherein said densification aid is hafnium oxide.

13. A coated ceramic cutting tool in accordance with claim 1 wherein said densification aid is zirconium oxide.

* * * * *